United States Patent
Jin et al.

(10) Patent No.: US 9,524,145 B2
(45) Date of Patent: Dec. 20, 2016

(54) REBUILDABLE SERVICE-ORIENTED APPLICATIONS

(75) Inventors: Ge Jin, Beijing (CN); Jia Tan, Beijing (CN); Zhi Rong Zhou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1451 days.

(21) Appl. No.: 12/404,986

(22) Filed: Mar. 16, 2009

(65) Prior Publication Data

US 2009/0249288 A1  Oct. 1, 2009

(30) Foreign Application Priority Data

Mar. 28, 2008  (CN) .......................... 2008 1 0089837

(51) Int. Cl.
  *G06F 9/44*  (2006.01)
  *G06N 5/00*  (2006.01)
  *G06F 9/445*  (2006.01)

(52) U.S. Cl.
  CPC . *G06F 8/20* (2013.01); *G06F 8/36* (2013.01); *G06F 8/24* (2013.01); *G06F 8/30* (2013.01); *G06F 8/72* (2013.01); *G06F 9/44521* (2013.01); *G06N 5/00* (2013.01)

(58) Field of Classification Search
  CPC ................ G06F 8/30; G06F 8/24; G06F 8/36; G06F 8/71; G06F 8/72; G06F 9/44521; H04L 67/34
  See application file for complete search history.

(56) References Cited

U.S. PATENT DOCUMENTS

| | | | |
|---|---|---|---|
| 5,561,800 A * | 10/1996 | Sabatella ...................... 719/331 |
| 5,600,789 A * | 2/1997 | Parker et al. .............. 714/38.11 |
| 5,634,058 A * | 5/1997 | Allen et al. ................... 717/163 |
| 5,758,160 A * | 5/1998 | McInerney et al. .......... 717/104 |
| 5,781,720 A * | 7/1998 | Parker et al. .............. 714/38.11 |
| 5,867,709 A * | 2/1999 | Klencke ........................ 717/111 |
| 5,953,524 A * | 9/1999 | Meng et al. .................. 717/108 |
| 5,995,133 A * | 11/1999 | Kim ................................ 725/28 |
| 6,115,710 A * | 9/2000 | White |
| 6,829,732 B2 * | 12/2004 | Whiteside et al. .......... 714/38.1 |
| 7,437,712 B1 * | 10/2008 | Brown et al. ................. 717/122 |

(Continued)

OTHER PUBLICATIONS

Ashraf A. Shahin, Variablility Modeling for Customizable SAAS Applications, 2014 , retrieved online on Jul. 29, 2016, pp. 1-11. Retrieved from the Internet: <URL: https://arxiv.org/ftp/arxiv/papers/1409/1409.2156.pdf>.*

(Continued)

*Primary Examiner* — Thuy Dao
*Assistant Examiner* — Hanh T Bui
(74) *Attorney, Agent, or Firm* — Steven L. Nichols; Fabian VanCott

(57) ABSTRACT

A method includes receiving a selection of a predefined implementation variation for a variable service component in at least one computing device configured to implement a service-oriented application; and executing source code associated with the variable service component in response to receiving the selection, wherein the source code performs a predetermined rebuilding of at least a portion of the service-oriented application such that the variable service component is redefined according to the selected implementation variation.

17 Claims, 6 Drawing Sheets

(56) References Cited

U.S. PATENT DOCUMENTS

| | | | |
|---|---|---|---|
| 7,640,533 B1* | 12/2009 | Lottero et al. | 717/108 |
| 7,886,018 B2* | 2/2011 | Tseitlin et al. | 709/217 |
| 7,926,030 B1* | 4/2011 | Harmon | G06F 9/4446 717/121 |
| 2002/0099975 A1* | 7/2002 | Whiteside et al. | 714/15 |
| 2004/0181534 A1* | 9/2004 | Mortensen | G06F 8/71 |
| 2005/0155029 A1* | 7/2005 | Nguyen et al. | 717/168 |
| 2005/0192916 A1* | 9/2005 | Serrano-Morales et al. | 706/47 |
| 2005/0240558 A1* | 10/2005 | Gil et al. | 707/1 |
| 2006/0080682 A1* | 4/2006 | Anwar et al. | 719/331 |
| 2006/0101038 A1* | 5/2006 | Gabriel | G06F 8/71 |
| 2007/0055972 A1* | 3/2007 | Brown | G06F 8/61 717/174 |
| 2007/0216965 A1* | 9/2007 | Yoshihama | 358/474 |
| 2008/0222238 A1* | 9/2008 | Ivanov et al. | 709/202 |
| 2008/0222621 A1* | 9/2008 | Knight | G06F 8/71 717/151 |
| 2008/0228505 A1* | 9/2008 | Hanes | G06Q 10/04 705/1.1 |
| 2009/0089753 A1* | 4/2009 | Yoshimura et al. | 717/121 |
| 2009/0125878 A1* | 5/2009 | Cullum et al. | 717/106 |
| 2010/0180272 A1* | 7/2010 | Kettler et al. | 717/171 |
| 2013/0198717 A1* | 8/2013 | Igelka | G06F 8/71 717/121 |
| 2016/0070566 A1* | 3/2016 | Krueger | G06F 8/71 717/121 |
| 2016/0154629 A1* | 6/2016 | Noens | G06F 8/31 717/107 |

OTHER PUBLICATIONS

Fazal-e-Amin et al., An Analysis of Object Oriented Variability Implementation Mechansims, ACM, Nov. 2011, retrieved online on Jul. 29, 2016, pp. 1-4. Retrieved from the Internet: <URL: http://delivery.acm.org/10.1145/1930000/1921538/p1-fazal-e-amin.pdf?>.*

C. Matthew MacKenzie et al., Reference Model for Service Oriented Architecture 1.0, OASIS, Oct. 12, 2006, retrieved online on Jul. 29, 2016, pp. 1-31. Retrieved from the Internet< URL: http://ggatz.com/images/soa-rm.pdf>.*

* cited by examiner

REBUILDABLE SERVICE-ORIENTED APPLICATIONS

BACKGROUND OF THE INVENTION

A service-oriented application is a group of computer-implemented autonomous software modules, commonly referred to as services that are organized to communicate with each other to accomplish one or more goals. Each service encapsulates a unique logical functionality over which it has exclusive control. This logical functionality that can be accessed by the other services in its respective application through protocols defined by what is known as a service contract.

Often, similar service-oriented applications are provided to different consumers whose requirements may vary from one to another. Accordingly, service-oriented applications are often customized to the individual requirements of a consumer. However, at times the differences in service-oriented applications for different end consumers are relatively trivial (e.g., slight variations in inter-service communication protocol or service logic), whereas much of the overall structure and functionality of the applications is similar enough to recycle for each consumer solution.

BRIEF SUMMARY OF THE INVENTION

A method includes receiving a selection of a predefined implementation variation for a variable service component in a service-oriented application; and executing source code associated with the variable service component in response to receiving the selection, wherein the source code performs a predetermined rebuilding of at least a portion of the service-oriented application such that the variable service component is redefined according to the selected implementation variation.

A method for rebuilding a service-oriented application includes defining variable portions of a service component in a service model associated with the service-oriented application; providing source code configured to implement predefined variations in the service component; receiving a selection of one of the predefined variations related to the service component; and performing by the source code a predetermined rebuilding process on the service component in the service-oriented application, using the selection of the predefined variations as an input.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION OF THE INVENTION

Figure 1:
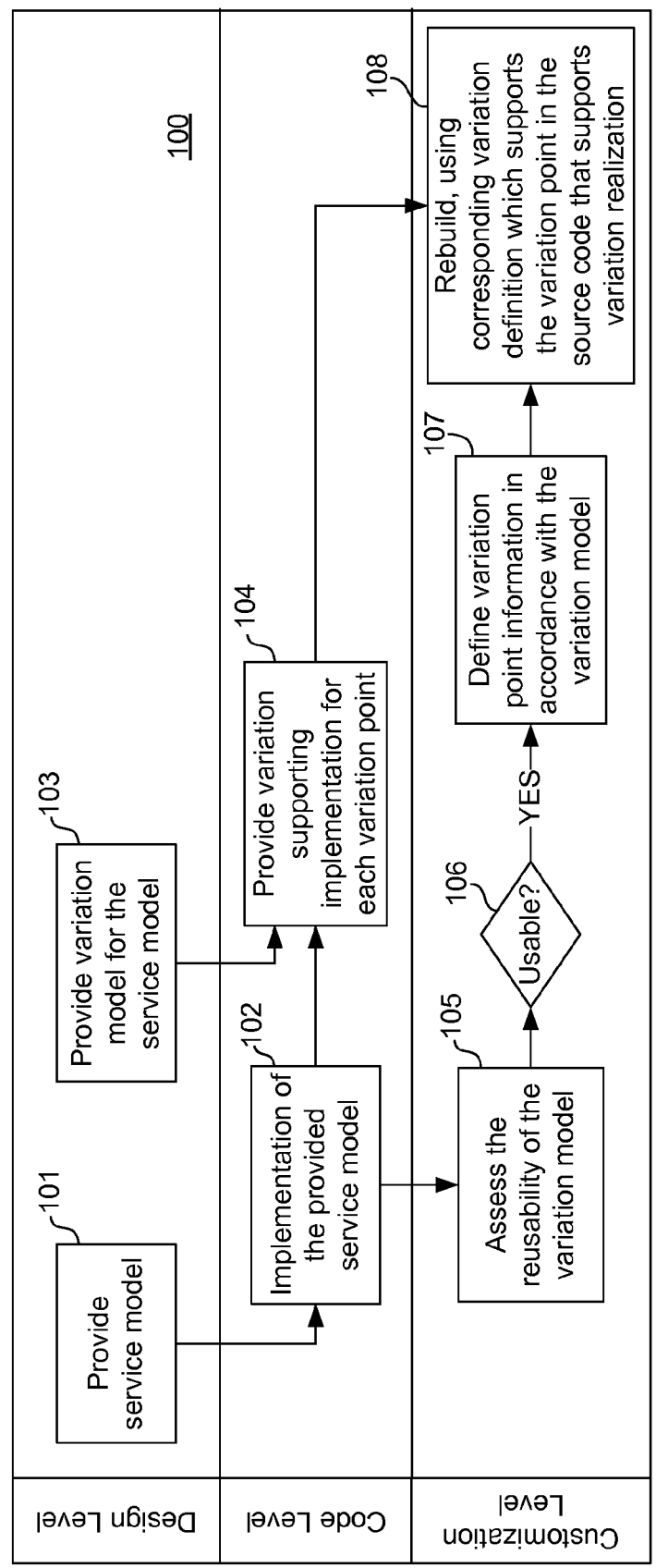
FIG. 1 is a flow diagram of an illustrative method for rebuilding a service-oriented application, according to one exemplary embodiment of principles described herein.

As described above, often similar service-oriented applications may be provided to different consumers whose requirements may vary from one to another. Accordingly, service-oriented applications are often customized to the individual requirements of a consumer. However, at times the differences in service-oriented applications for different end consumers are relatively trivial (e.g., slight variations in inter-service communication protocol or service logic), whereas much of the overall structure and functionality of the applications is similar enough to recycle for each consumer solution.

Accordingly, the present specification discloses service-oriented applications that can be rebuilt according to predefined implementation variations of service components in the applications. This rebuilding occurs in response to a selection from a user.

As used in the present specification and in the appended claims, the term "service" refers to a computer-implemented autonomous software module with a specific functionality and the ability to interact with other software modules.

As used in the present specification and in the appended claims, the term "service-oriented application" refers to a computer-implemented application utilizing a plurality of services that interact with each other to accomplish a desired functional goal.

As used in the present specification and in the appended claims, the term "service contract" refers to a set of defined policies governing interservice communications.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer-readable (i.e., computer-usable) medium(s) having computer-usable program code embodied thereon.

Any combination of one or more computer-readable medium(s) may be utilized. The computer-readable medium may be a computer readable signal medium or a computer readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-readable storage medium could even be paper or another suitable medium upon which a program is printed, as the program can be electronically captured, via, for instance, optical scanning of the paper or other medium, then compiled, interpreted, or otherwise processed in a suitable manner, if necessary, and then stored in a computer memory. In the context of this document, a computer-readable storage medium may be any medium that can contain, or store a program for use by or in connection with an instruction execution system, apparatus, or device.

A computer readable signal medium may include a propagated data signal with computer-usable program code embodied therein, for example, in baseband or as part of a carrier wave. Such a propagated signal may take any of a variety of forms, including, but not limited to, electromagnetic, optical, or any suitable combination thereof, A computer readable signal medium may be any computer-readable medium that can contain, store, communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc. Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, an illustrative method (100) is shown for providing a rebuilding solution for a service-oriented application according to the present invention.

In step 101 a service model is provided at a design level. The service model, which represents a service-oriented solution, is a set of services and business processes interrelated in a specific industry/commerce/institution field, such as case management in government sectors.

In step 102 a service model implementation is provided at code level. A service implementation, which is source code of a service model, may be a file including a series of statements written in a human-readable language (such as C, C++, C#, assembler, Fortran, BASIC, Pascal, Java, LISP, ML, Objective-C, Perl, PHP, Python, MATLAB, Visual Basic, SQL, HTML, XML or any other computer languages), may also include graphical information defining a human-readable computer language represented by a graphical component.

A service model is an abstraction of the source code and may be a graphical model of any type, including, for example, a tree structure, a relational chart, a textual model, and the like.

The source code itself (service model) may be stored in a storage device and/or memory, and can also be shown on a display. A component in the source code of the service model and a component in the service model are linked with each other by annotation or other approaches. As known those having ordinary skill in the art, source code for calling a function can be generated by transformation from a definition of a model. Alternatively, the model can be generated from the source code. Therefore the ordering of steps 101 and 102 is not restricted in the present specification.

In step 103, a variation model is provided which defines to what extent the service model (SOA solution) may change. It is noted that step 103 and step 101 are not required to be carried out at the same time although both step 101 and step 103 are at design level, because the rebuilding implement (rebuilding solution) including the variation model can be provided within an indeterminate period of time after the service model is provided to a customer.

A first consideration in creating the variation model is that common and variable service components may be determined in the service model at analysis level prior to designing a variation model. The variable service component, which may be a component of a service contract, normally comprises a functional entity such as a business process, a service, a service description, a service communication protocol and/or transmission, etc.; and/or a QoS-related non-functional entity including policy, security (a set of rules), a transaction (a set of attributes), and/or management.

A predefined interface variation protocol may then be created, which is the variation model for defining selectable variation point information related to the variable service component in the service model, based on the determined variable service component. Particularly, the variation model may define which interface of which service is variable and how it may change, thereby normalizing the variable service area and providing a manageable/controllable variation definition is provided. For different fields, different customers and different requirements, various possible and reasonable variations have to be identified at service contract level, to determine service components which possibly need to be changed. The more the variations are, the more complex the variation model is.

The variation point information related to the variable service component comprises variability information for defining whether and to what extent the service component is variable, and in particular comprises adding, removing or modifying a message field, adding, removing or modifying a service operation (including publishing, discovering, binding and invocation), and/or adding, removing or modifying a non-functional requirement of a service (transaction, security). The adding, removing or modifying of a message field comprises, for example, adding a field to an existing input/output message definition, removing a field from an existing message definition, etc.

In step 104, a variation supporting implementation for each variation point is provided at a code level. The variation supporting implementation for each variation point in the variation model may be provided based on a consistent understanding of the source code of the service model at the same time as or after a normalized service model is provided.

The variation supporting implementation, which may be code or a set of scripts (source code) that supports variation implementation, may include a file having a series of statements written in a human-readable language and may also include graphical information defining a human-readable computer language represented by a graphical component. The file containing source code and/or associated source code (service model) as well as the variation model can be stored in a storage device and/or memory, and can also be shown on a display.

The source code that supports variation implementation defines variations of the service model and the service model source code required for realizing the variation point information related to the variable service component, that is, it defines a variation of the service component itself to be realized at service model level and at code level and a variation definition of an impact on a service contract are defined. While being executed, the source code that supports variation implementation is used to modify the service model and the service model source code according to a corresponding variation definition that supports implementation of a selected variation point in the source code, using a selection of variation point information related to the variable service component in the variation model as an input, so as to achieve a predetermined rebuilding process. That is to say, the predetermined rebuilding process is predefined in the source code that supports variation implementation. The rebuilding process will be described in detail hereinafter.

The above variation definition of an impact on a service contract defines a variation of other service component induced by the variation of the service component, for example, if a service message changes, some other services or business processes must change too.

Therefore steps 102 and 104 constitute a process of defining a variation model and providing a variation supporting implementation. By this method, a possible variation (i.e. variation model) of a SOA solution (i.e. service model) and an implementation that supports the above possible variation (i.e. variation supporting implementation) can be provided when the solution and its implementation are provided to a customer, so that the SOA solution is of more agility to different end consumers.

The reusability of the variation model is assessed in step 105. A consumer, through for example a human-computer interface, determines whether the selectable variation point information provided by the variation model includes the variation points which the customer needs, when a service-oriented application needs to be rebuilt. That is, determining whether the variation model supports a desired variation of the service-oriented application.

If it is determined in step 106 that the variation point which the customer needs can be provided in the variation model, the customer may selects the supported variation point information through a human-computer interface in step 107.

As a variation model instance complying with the variation model, the selected variation point information defines how a service contract actually changes in the customer's environment. For example, it is defined in the variation model that three service message fields can be removed while only one or two fields is going to be removed in a variation model instance.

With the selected variation point information obtained in step 107 as input customization information, the service model and service model source code are automatically modified in step 108 using a corresponding variation definition which supports the selected variation point in the source code that supports variation implementation, so as to achieve a predetermined rebuilding process. Therefore a customized service-oriented application is obtained for the customer.

Figure 2:
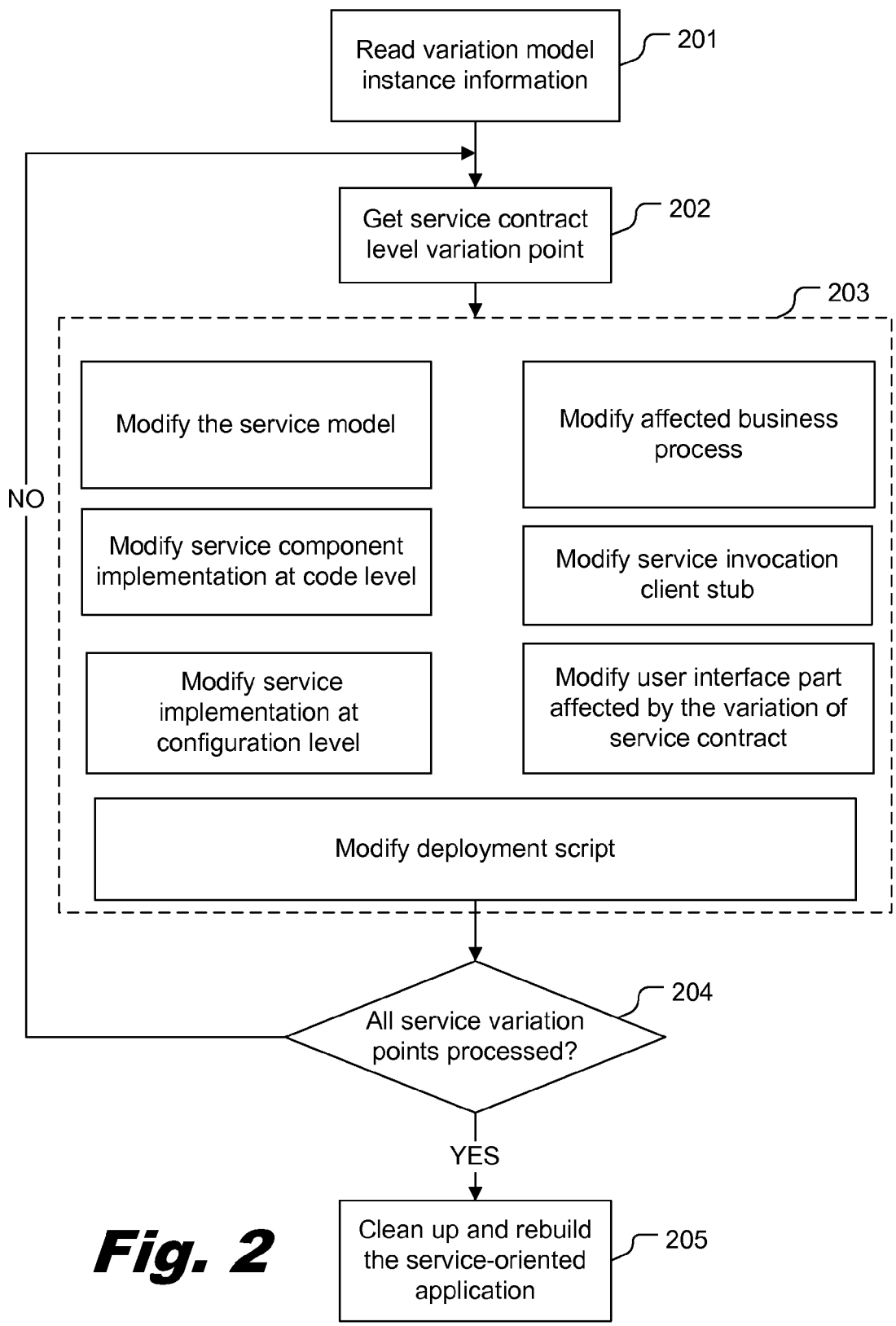
FIG. 2 is a flow diagram of an illustrative method of rebuilding a service-oriented application, according to one exemplary embodiment of principles described herein.

Particularly, a detailed procedure of step 108, i.e. a detailed rebuilding process, is illustrated in FIG. 2.

In step 201, information is read for the variation model instance based on a variable model, and in step 202, the service model variation point is obtained (Only one variation point is included in the information of the variation model instance, if the customer selects only one variation point). In step 203, the service model and the service model source code are automatically modified to achieve the predetermined rebuilding process. In step 204, a determination is made as to whether all the selected service variation points have been processed; and in step 205, the service-oriented application is cleaned up and rebuilt if all the selected service variation points are processed.

The predetermined rebuilding process (step 203) is based on a predetermined variation definition in the source code that supports variation implementation, and may include the following steps the order of which is not restricted: modifying the service model, normally including WSDL and XSD (BO) definitions, planning, and attributes of a service registry; modifying a deployment script of the service-oriented application, such as a DB script of a variation of a data model, and some variations of a non-functional requirement which require deployment support by a middleware platform in the service contract (such as a variation of security or a transaction). Additionally, the predetermined rebuilding process may include at least one of the following steps: modifying a service component implementation at code level, and only a program skeleton will be generated for a new service operation; modifying a service implementation, such as a configuration file or a definition of a business rule, at configuration level; modifying an affected business process to incorporate variations in the whole process, which normally includes modifying a BPEL definition file or other workflow defining languages; modifying only a service invocation client stub in the service-oriented application (normally including modifying service invocation code and the client stub), which does not include modifying other service implementations; and modifying a user interface part affected by the variation of the service contract.

Figure 3:
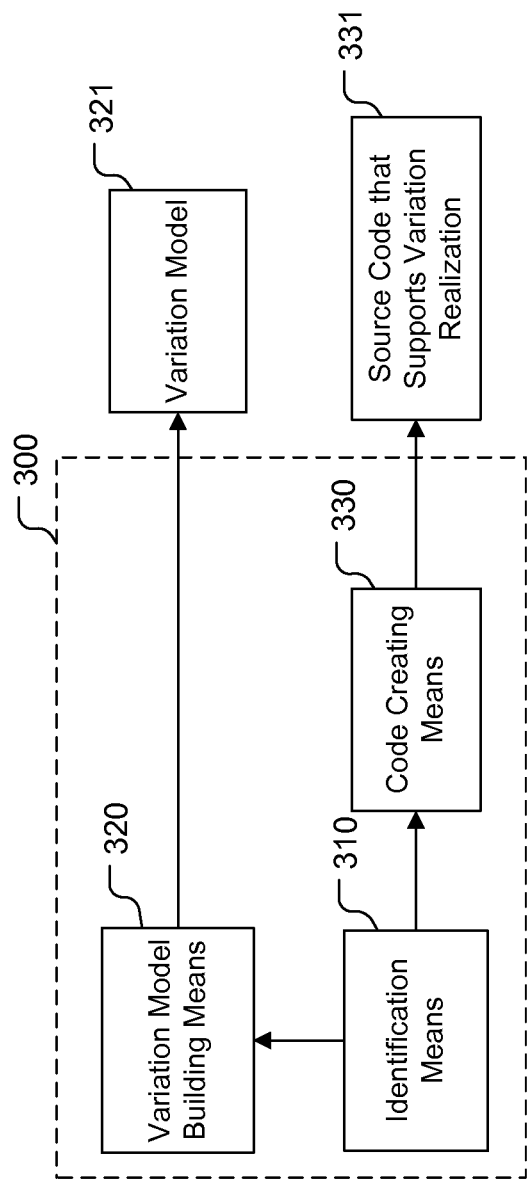
FIG. 3 is a diagram of an illustrative device for providing a rebuilding solution for a service-oriented application, according to one exemplary embodiment of principles described herein.

FIG. 3 illustrates a device 300 for providing a rebuilding solution, including: an identification means 310, configured to identify a variable service component in the service model; a variation model building means 320, configured to build a variation model 321 for defining selectable variation point information related to the variable service component based on the variable service component; and a code creating means 330, configured to create source code 331 that supports variation implementation.

Figure 4:
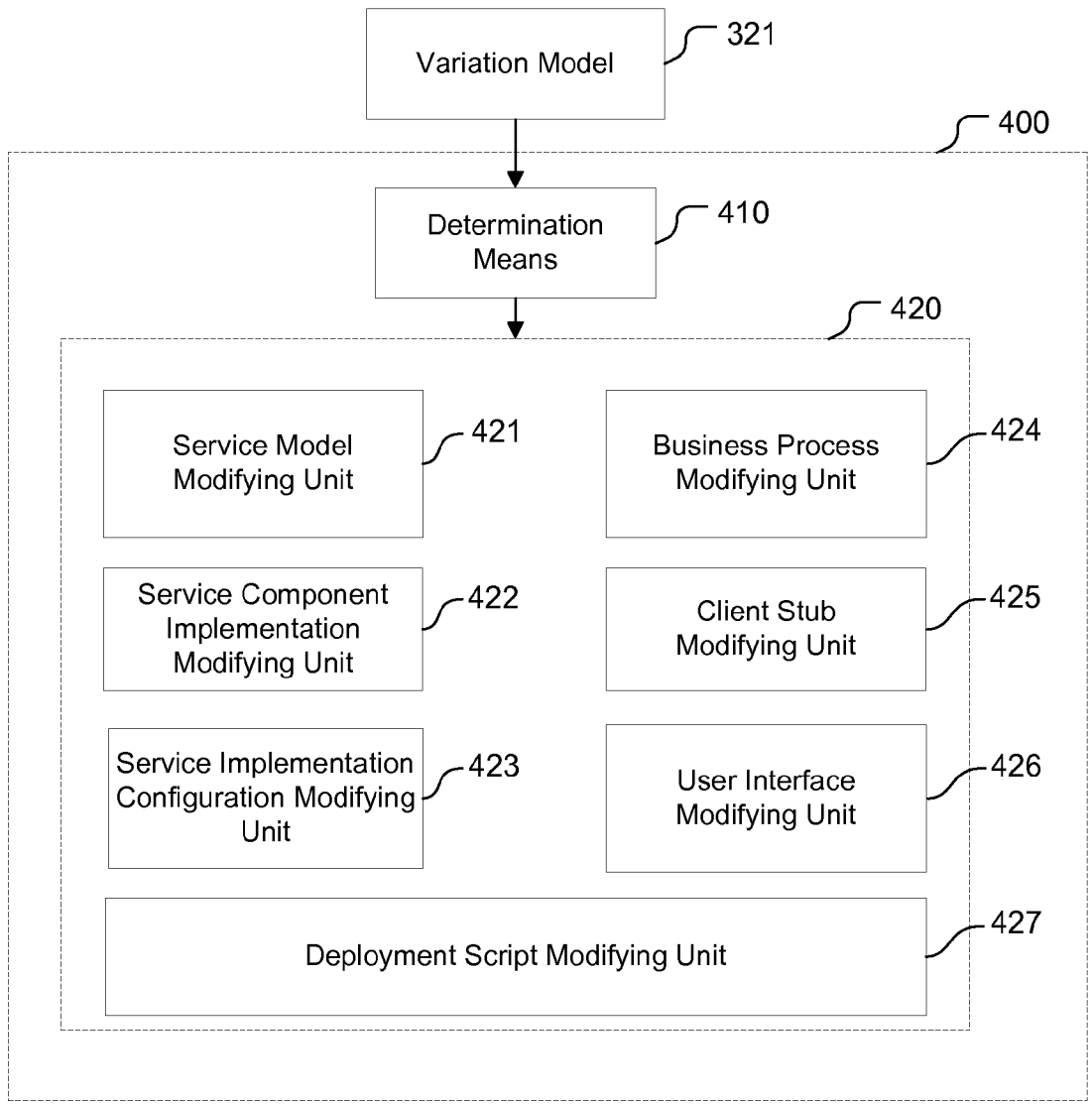
FIG. 4 is a diagram of an illustrative device for rebuilding a service-oriented application, according to one exemplary embodiment of principles described herein.

FIG. 4 illustrates a corresponding device 400 for rebuilding a service-oriented application, including: a determination means 410 configured to determine variation point information related to a variable service component by reading the variation point information (or information of a variation model instance constituted by information of a plurality of variation points) from a variation model 401 after selecting the variation point from a variation model 321. The device 400 also includes a modification means 420, configured to receive determined variation point information as an input, and perform a predetermined rebuilding process on the service model and the service model source code based on source code 331 that supports variation implementation, which source code defines variations of the service model and the service model source code required for realizing the variation point information related to the service component.

The modification means 420 may include a service model modifying unit 421, a deployment script modifying unit 427 and at least one of the following units: a service component implementation modifying unit 422, a service implementation configuration modifying unit 423, a business process modifying unit 424, a client stub modifying unit 425 or a user interface modifying unit 426. These units process detailed procedures of the above step 203 respectively.

Source code that supports variation implementation to achieve the above rebuilding process is service-specific. Different specific rebuilding procedures (as shown in step 203 of FIG. 2), modification units (as in modification means 420 shown in FIG. 4), or combinations thereof are required for different variations of a service component, which could be analyzed by a designer according to a specific service component in the service-oriented application and an impact of its variation.

For example, any variation (including variations of functional and non-functional requirements) of the service component normally requires modifying the service model and a deployment script by a service model modifying unit 421 and the deployment script modifying unit 427; modifying a service component implementation and a service invocation client stub by the service component implementation modifying unit 422 and the client stub modifying unit 425 when a service message changes; modifying an affected business process by the business process modifying unit 424 if a service message changes and occurs in some business process or business process definitions; and the service implementation configuration modifying unit 423 is also required if a configuration mechanism or a rules engine is used in the service; the user interface modifying unit 426 is required if there is a user interface associated with the service of which a message changes. Only the service model and the deployment script are required to be modified by a service model modifying unit 421 and a deployment script modifying unit 427, if only a non-functional requirement changes.

Variation Meta-Model

The variation model, which is an instance of the variation meta-model, may be obtained based on a variation meta-model. The variation meta-model defines a definition format of all variation point information (variation point) related to the variable service component. The variation model itself may also contain all information of the variation meta-model, that is, the variation model itself may also define all variation point information related to the variable service component.

A variation meta-model defines how to define a variation model. It can be complex or simple according to different requirements of different service-oriented applications. The variation meta-model may be a graphical model of any type, for example, a tree structure, a relational chart, etc., or a textual model. An example of a variation meta-model which defines all variation point information related to a variable service component written in XML is given as follows.

```
<?xml version="1.0" encoding="UTF-8"?>
<schema targetNamespace="http://www.ibm.com/WSVariation" elementFormDefault="qualified"
xmlns="http://www.w3.org/2001/XMLSchema" xmlns:tns="http://www.ibm.com/WSVaFriation">
        //XML header, defining a namespace of the variation meta-
model ( http://www.ibm.com/WSVariation )
    <complexType name="ServiceVariation"> // definition of variation point, normally corresponding to a
service
        <attribute name='serviceName' type='string'/> // name of service
        <attribute name="serviceNamespace" type="string"></element> // namespace of the service
corresponding to a variation point
        <attribute name="servicePortType" type="string"></element> // port type of the service corresponding to
the variation point, to define from which service the variation point is, as the line above
        <sequence>
            <element name="inputMessageVariation" type="tns:MessageVariation"></element> // variable point
of an input message in the variation point
        </sequence>
            <element name="outputMessageVariation" type="tns:MessageVariation"></ element> // variable
point of an output message in the variation point
            < element name="serviceVariability">  // define variability of the variation point in general
            <simpleType>
            <restriction base="string">
            <enumeration value="Fixed"></enumeration>  // not variable
            <enumeration value="Editable"></enumeration> // editable, but not variable
            <enumeration value="Removable"></enumeration> // removable
            </restriction>
            </simpleType>
```

```
    </ element >
  </sequence>
  </complexType>
  <complexType name="MessageVariation"> // definition of variability of the input message
  <sequence>
    < element name="fieldVariation" type="tns:FieldVariation"   // variability of its fields constitutes
variability of an input message
      maxOccurs="unbounded" minOccurs="0">
</ element>
</sequence>
  </complexType>
<complexType name="FieldVariation"> // definition of variability of a message field
<sequence>
  < element name="fieldAddable" type="boolean" maxOccurs="1" minOccurs="0"> </ element> // can
another message be added after the field?
  < element name="fieldRemoable" type="boolean" maxOccurs="1" minOccurs="0"></ element> // is the
field removable?
  < element name="fieldFixed" type="boolean" maxOccurs="1" minOccurs="0"></ element> // the field is
not editable
  <element name="fieldModifiable" type="boolean" maxOccurs="1" minOccurs="0"></ element> // the
field is editable
  </sequence>
  <sequence>
  <element name="fieldRemoved" type="boolean" maxOccurs="1" minOccurs="0"> </ element> // the field is
removed
  < element name="fieldAdded" type="AddedField" maxOccurs=" unbounded" minOccurs="0"> </ element>
// another filed is added after the field, which is defined in AddedField
  < element name="fieldModified" type="ModifiedField" maxOccurs="1" minOccurs="0"></ element > //
the field is modified according to ModifiedField
  < element name="fieldName" type="string" maxOccurs="1" minOccurs="0"></ element> // name of the
field
  </sequence>
</complexType>
<ComplexType name='AddedField' base='string'> <attribute name='fieldType' type='string'/>
</ComplexType> // type and name of the added field
  <ComplexType name='Modified' base='string'>
  <attribute name='fieldNewType' type='string'/>      // modify type and name of a field
<attribute name='fieldNewName' type='string'/>       // new name of the modified field
< element name="nestedField" type="Modified" minOccurs="0"> </ element> // support modification of a
nested field
</ComplexType>
    <element name="solutionVariation" type="tns:ServiceVariationCollection"></ element> // modify type
and name of a field
    <complexType name="ServiceVariationCollection"> // definition of variation model
    <sequence>
    < element name="serviceVariation" type="tns:ServiceVariation" minOccurs="0"
maxOccurs="unbounded"></ element > // definition of variation model is comprised of a plurality of points
    </sequence>
    </complexType>
```

An example of these principles will now be described in detail with reference to a variation of a service component in a service "CreateOrganization" (creating a new organization) in the service-oriented application.

Figure 5:
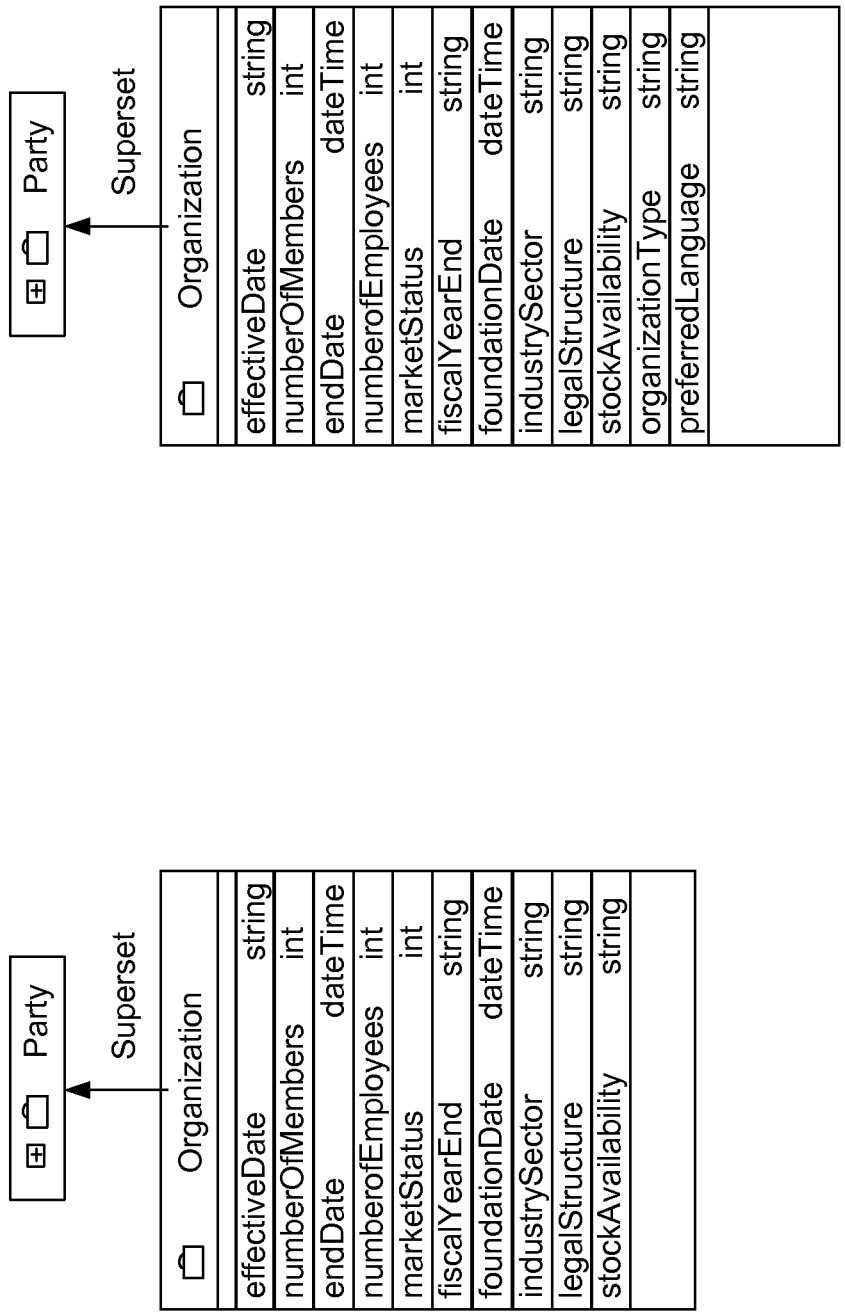
FIGS. 5A and 5B are respective diagrams of a variable service component before and after a service-oriented application is rebuilt, according to one exemplary embodiment of principles described herein.

FIG. 5A illustrates the service "CreateOrganization", the input message of which is an entity of superset Organization. Attributes of the service shown in the figure include, among others, a string effectivDate (effective date), and an integer numberOfMember (number of members).

The variable service component may be identified based on knowledge of the service model of the service-oriented application, for example, adding a message field to the service "CreateOrganization" and creating in a variation model. The variation model based on for example the above variation meta-model is shown below.

```
<?xml version="1.0" encoding="UTF-8"?>
<serviceVariationCollection xmlns:wsv="http://www.ibm.com/
WSVariation">
<serviceVariation
serviceName="CreateOrganizationService",serviceNamespace=
"http://www.ibm.com/CreateOrganizationService ", servicePortType=
"http://www.ibm.com/CreateOrganizationServicePortType">
<serviceVariability>Editable<serviceVariability>
<inputMessageVariation>
<fieldVariation>
<fieldName>stockAvailable</fieldName>     // another field
can be added after this field
<fieldAddable>true</fieldAddable>
</fieldVariation>
</inputMessageVariation>
</ServiceVariation>
</ServiceVariationCollection>
```

Source code for realizing "adding a message field" is created based on the understanding of services and business processes of the service-oriented application when the variation model is built.

In the present example, two new attributes, e.g. organizationType (type of the organization) and preferredLanguage (preferred language), are added upon a user's requirement changes. Thus two attributes are added to the end of Organization as shown in FIG. 5B.

The user may select adding two message fields through the variation model as a variation model instance. The variation model instance contains two variation points as follows:

```xml
<?xml version="1.0" encoding="UTF-8"?>
<serviceVariationCollection xmlns:wsv="http://www.ibm.com/WSVariation">
<serviceVariation
serviceName="CreateOrganizationService",serviceNamespace=
"http://www.ibm.com/CreateOrganizationService ",servicePortType=
"http://www.ibm.com/CreateOrganizationServicePortType">
<inputMessageVariation>
<fieldVariation>
<AddedField name="organizationType", type="string"/>     //add a string field "organizationType"
<AddedField name="preferredLanguage", type="string"/>    //add a string field "preferredLanguage"
</fieldVariation>
</inputMessageVariation>
</ServiceVariation>
</ServiceVariationCollection>
```

The device for rebuilding the service-oriented application receives information of the variation model instance information and executes predetermined source code for realizing "adding a message field". Particularly, the device modifies the service model by modifying WSDL and XSD (BO) definitions, planning, or attributes of a service registry; modifies a service component implementation at code level; modifies a service invocation client stub (for example service invocation code and the client stub) in the service-oriented application; modifies a deployment script (for example a DB script) of the service-oriented application, thereby performing the rebuilding process on the service model and service model source code. Both the rebuilt service model and service model source code support the service component "CreateOrganization" which is added with the above two message fields, thus a customized service-oriented application is provided.

Furthermore, it should be noted that, the above series of processes and means may also be implemented by software and/or firmware. In case of implementing them by software and/or firmware, a program constituting the software may be installed into a computer with dedicated hardware, for example, a general-purpose personal computer 600 as shown in FIG. 6 from a storage medium or a network, and the computer is capable of performing various functions if with various programs installed therein.

Figure 6:
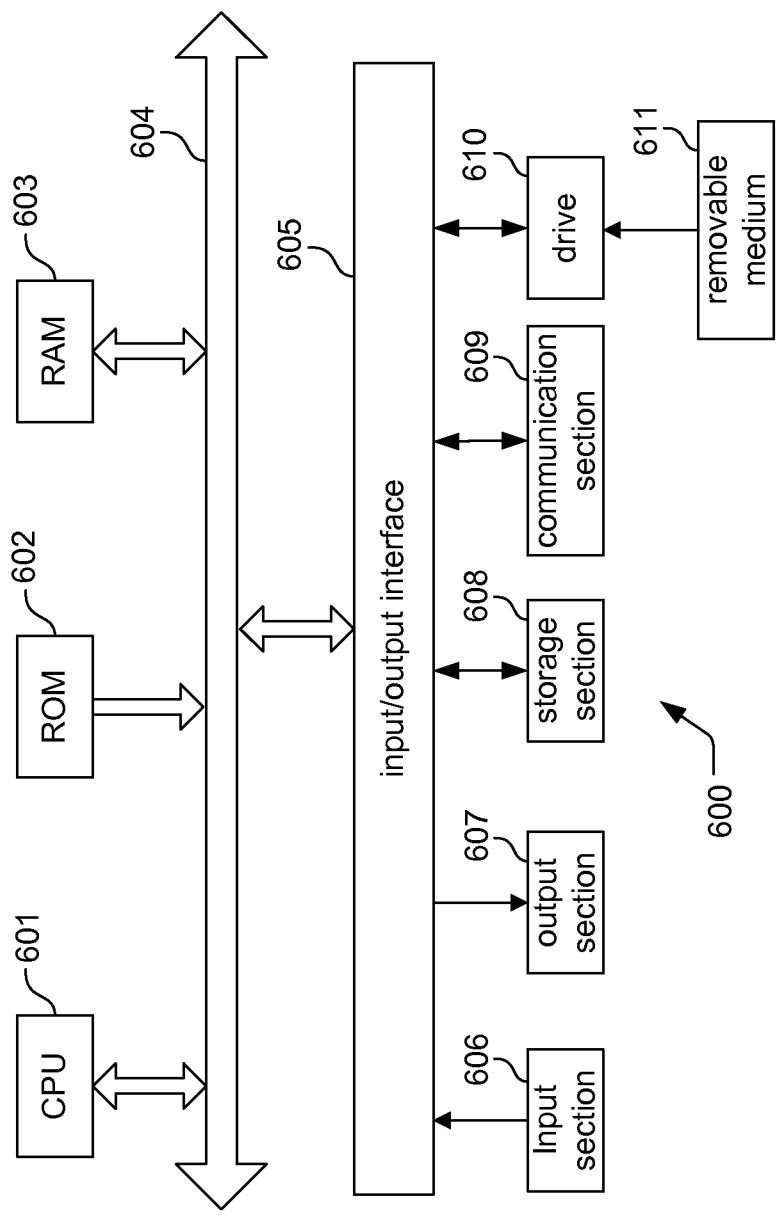
FIG. 6 is a diagram of an illustrative computer system, according to one exemplary embodiment of principles described herein.

In FIG. 6, a Central Processing Unit (CPU) 601 performs various processes based on a program stored in a Read Only Memory (ROM) 602 or a program loaded from a storage section 608 to a Random Access Memory (RAM) 603. In the RAM 603, data necessary when the CPU 601 performs the various processes or the like is also stored as necessary.

A CPU 601, a ROM 602, and a RAM 603 are connected to one another via a bus 604. An input/output interface 605 is also connected to the bus 604.

To the input/output interface 605 are connected: an input section 606 including a keyboard, a mouse, or the like; an output section 607 including a display such as a Cathode Ray Tube (CRT), a Liquid Crystal Display (LCD), or the like, and a loudspeaker or the like; the storage section 608 including a hard disk or the like; and a communication section 609 including a network interface card such as a LAN card, a modem, or the like. The communication section 609 performs a communication process via the network such as the Internet.

A drive 610 is also connected to the input/output interface 605 as necessary. A removable medium 611, such as a magnetic disk, an optical disk, a magneto-optical disk, a semiconductor memory, or the like, is loaded on the drive 610 as necessary, so that a computer program read therefrom may be installed into the storage section 608 as necessary.

In the case where the above-described series of processes is implemented with software, the program that constitutes the software may be installed from a network such as the Internet or a storage medium such as the removable medium 611.

Those skilled in the art would appreciate that, the storage medium is not limited to the removable medium 611 having the program stored therein as illustrated in FIG. 6, which is delivered separately from the device for providing the program to the user. Examples of the removable medium 611 include a magnetic disk (including a Floppy Disk (registered trademark)), an optical disk (including a Compact Disk-Read Only Memory (CD-ROM) and a Digital Versatile Disk (DVD)), a magneto-optical disk (including a Mini-Disk (MD) (registered trademark)), and a semiconductor memory. Alternatively, the storage medium may be the ROM 602, the hard disk contained in the storage section 608, or the like, which has the program stores therein and is delivered to the user together with the device that contains them.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method comprising:
receiving confirmation, from a customer, that functional and non-functional variable service components of a service-oriented application comprise variability point information that supports an acceptable variation of the service-oriented application;
in which the variability point information defines how and to what extent a variable service component may be varied by a customer of the variable service component; and
in which the variable service components are predefined in an interface variation protocol defining the selectable variation point information related to the variable service component prior to the customer accepting the variation of the service-oriented application; and
receiving, from the customer, a selection of the variability point information defining how and to what extent the variable service components are to be varied in at least one computing device configured to implement a service-oriented application;
executing source code associated with said variable service component in said at least one computing device in response to receiving said selection, and
receiving at least one parameter associated with said selection from said predetermined set of available variations in said service component;
said source code performing a predetermined rebuilding of at least a portion of said service-oriented application such that said variable service component is redefined according to said selected variability point information; and
where a non-functional variable service component is the only component selected by the customer to be variable, modifying only a service model representing the service-oriented application and a deployment script of the service-oriented application.

2. The method of claim 1, in which said variable service component comprises at least one of: a service, a process implemented by a service, a service description, a service communication protocol, and a service communication transmission.

3. The method of claim 1, in which said variable service component is a component of a service contract for a service in said service-oriented application.

4. The method of claim 1, in which said variability point information defining how and to what extent a variable service component may be varied comprises at least one of: adding at least one message field to an input/output message definition associated with said variable service component, removing at least one message field from said input/output message definition, and modifying at least one message field in said input/output message definition.

5. The method of claim 1, in which said variability point information defining how and to what extent a variable service component may be varied comprises adding a service operation to a service, removing a service operation from a service, modifying a service operation associated with a service, adding a non-functional requirement of a service, removing a non-functional requirement of a service, and modifying a non-functional requirement of a service.

6. A method for providing a rebuilding solution for a service-oriented application, said service-oriented application comprising a service model and service model source code associated with said service model, said method comprising:
defining functional and non-functional variable portions of a service component in a service model associated with said service-oriented application;
providing source code, via a graphical component, describing the functional and non-functional variable portions of the service component, the functional and non-functional variable portions each comprising a predefined variation;
receiving confirmation from a customer that the functional and non-functional variable portions of the service component in the service model are sufficient to rebuild the service-oriented application,
in which the functional and non-functional variable portions in the service component are predefined in an interface variation protocol prior to the customer confirming the functional and non-functional variable portions of the service component are sufficient; and
in which the source code describing the functional and non-functional variable portions of the service component define how and to what extent the variable service component may be varied by a customer of the variable service component; and
receiving, from the customer, a selection of the functional and non-functional variable portions of the service component defining how and to what extent the variable service component is to be varied in at least one computing device configured to implement a service oriented application;
performing, by said source code, a predetermined rebuilding process on said service component in said service-oriented application implemented by said computing device, using said selection of the functional and non-functional variable portions as an input; and
receiving at least one parameter associated with said selection from said predetermined set of available variable portions in said service component;
wherein, where a non-functional variable service component is the only component selected by the customer to be variable, only a service model representing the service-oriented application and a deployment script of the service-oriented application is modified.

7. The method of claim 6, wherein said predetermined rebuilding process is based on a variation definition in said source code.

8. The method of claim 6, wherein said service component comprises at least one of: a service, a process implemented by a service, a service description, a service communication protocol, and a service communication transmission.

9. The method of claim 6, wherein said predetermined rebuilding process comprises:
modifying a service model;
modifying a deployment script; and modifying at least one of: a service component implementation at a code level, a service implementation at a configuration level, an affected business process, a service invocation client stub in the service-oriented application, and a user interface component.

10. The method of claim 9, wherein said variable portions comprises at least one of a message field to be added, a message field to be removed, and a message field to be modified.

11. The method of claim 10, wherein said message field is a component of an existing input/output message definition associated with said variable service component.

12. A computer program product for rebuilding a service-oriented application, said computer program product comprising:
a computer readable storage memory device comprising computer usable program code embodied therewith, wherein the computer usable program code comprises computer usable program code to:
receive confirmation from a customer of a variable service component in the service-oriented application that variability information that defines how and to what extent functional and non-functional variable service components may be varied by a customer is accepted by the customer, in which the variable service components are predefined in an interface variation protocol defining selectable variation point information related to the variable service component prior to the customer accepting the variability information;
receive, from the customer, a selection of a predefined implementation variation for a variable service component in a service-oriented application, the predefined implementation variation defining how and to what extent the variable service component is to be varied;
perform a predetermined rebuilding of at least a portion of said service-oriented application in response to receiving said selection such that said variable service component is redefined according to said selected implementation variation; and
receive at least one parameter associated with said selection from said predetermined set of available variations in said service component;
wherein, where a non-functional variable service component is the only component selected by the customer to be variable, modifying only a service model representing the service-oriented application and a deployment script of the service-oriented application.

13. The computer program product of claim 12, wherein said variable service component comprises at least one of: a service, a process implemented by a service, a service description, a service communication protocol, and a service communication transmission.

14. The computer program product of claim 12, further comprising computer usable code comprising variability information that defines how and to what extent said variable service component may be modified.

15. The computer program product of claim 12, wherein said predefined implementation variation comprises: adding a message field, removing a message field, modifying a message field, adding a service operation, removing a service operation, modifying a service operation, adding a non-functional requirement of a service, removing a non-functional requirement of a service, and modifying a non-functional requirement of a service.

16. The computer program product of claim 15, wherein said message field is a component of an existing input/output message definition associated with said variable service component.

17. A method for providing a rebuilding solution for a service-oriented application, said service-oriented application comprising a service model and service model source code associated with said service model, the method comprising:
identifying functional and non-functional variable service components in said service model and, based on the functional and non-functional variable service components, a variation model for defining selectable variation point information related to said variable service component, wherein said variation point information related to the functional and non-functional variable service components comprises variability information defining whether and to what extent the service component is variable, and
creating source code that supports variation implementation of the service model, wherein said source code that supports said variation implementation defines variations of the service model and the service model source code for realizing the variation point information related to the functional and non-functional variable service components and is used for performing a predetermined rebuilding process on said service model and said service model source code according to a variation definition that supports implementation of the variation point in said source code, using a selection of variation point information related to the functional and non-functional variable service components in said variation model as an input; and
receiving at least one parameter associated with said selection from said predetermined set of available variations in said service component;
wherein, where a non-functional variable service component is the only component selected by the customer to be variable, modifying only a service model representing the service-oriented application and a deployment script of the service-oriented application.

* * * * *